Patented Feb. 6, 1945

2,369,096

UNITED STATES PATENT OFFICE 2,369,096

PREPARATION OF DIALKYL PEROXIDES

Richard Haven Wiley, Wilmington, Del., assignor to E. I. du Pont de Nemours & Company, Wilmington, Del., a corporation of Delaware No Drawing. Application May 29, 1943, Serial No. 489,100

6 Claims. (Cl. 260—610)

This invention relates to an improved process for the preparation of dialkyl peroxides and is more particularly related to the preparation of dialkyl peroxides from hydrogen peroxide and dialkyl sulfates.

Dialkyl peroxides and alkyl hydrogen peroxides have been known for some time and have been prepared by the interaction of dialkyl sulfates and hydrogen peroxide in an aqueous potassium hydroxide solution. Such a process is disclosed by Baeyer and Villiger, Ber. 34, 738 (1901). Owing to the fact that the alkyl hydrogen peroxides as well as the dialkyl peroxides formed in accord with these reactions are subject to detonation with great violence, considerable care must be exercised in their preparation.

An object of the present invention is to provide an improved process for the preparation of the alkyl peroxide and more particularly the dialkyl peroxides. Another object is to provide a process wherein the reaction of a dialkyl sulfate with hydrogen peroxide is conducted in an alkaline medium under uniformly controlled conditions. Yet another object is to provide a process for the preparation of these peroxides by a reaction in which the reactants are in the emulsified state. Other objects and advantages of the invention will hereinafter appear.

Alkyl hydrogen peroxides and/or dialkyl peroxides can be obtained in accord with the invention in excellent yields from alkyl hydrogen sulfates and/or dialkyl sulfates, hydrogen peroxide, and aqueous alkalies at temperatures between 30 and 100° C. preferably between 50 and 85° C. The invention is characterized by being effected under such conditions that intimate contact is attained between the reactants by means of emulsification. The reaction may be conducted, for example, by first preparing an emulsion of the dialkyl sulfate and the aqueous alkali used, mixing in the hydrogen peroxide and thereafter subjecting the resulting mixture to reaction temperatures; by preparing an emulsion of all the reactants and then subjecting the resulting emulsion to reaction temperatures or by any suitable emulsification method.

By conducting the reaction as generally described above, it has been found that violent uncontrollable reactions are eliminated, the decomposition of the dialkyl sulfate in the presence of the hydrogen peroxide proceeds at a uniform rate and by conducting the process in a continuous manner as will be more fully particularized hereinafter, a rapid, efficient, and economical process is provided.

The following examples described a preferred embodiment of the invention in which parts are by volume unless otherwise indicated.

*Example 1.*—An aqueous alkali solution (containing about 20% potassium hydroxide or the equivalent of sodium hydroxide) is fed continuously into an emulsifying vessel along with diethyl sulfate, the feed ratio of alkali solution to diethyl sulfate being about 2:1 on a volume basis. By way of suitable agitation an emulsion is formed and if desired its formation can be assisted by the use of an emulsifying agent which may be added to the alkali solution, to the sulfate solution, or to both in suitable amounts ranging up to about 2% prior to charging them into the emulsifying vessel. Emulsifying agents which are satisfactory include sulfonated castor oil (monopole oil), sodium salt of isopropylated naphthalene sulfonic acid which has been condensed with formaldehyde (compound 8), and Reed reaction product of aliphatic hydrocarbon (aliphatic sulfonate) (M. P. 189). The emulsion is fed from the emulsification vessel directly into a continuous mixer wherein 3 parts of the emulsion are mixed with ½ part of 30% hydrogen peroxide.

The resulting mixture is then passed into a steam (atmospheric) jacketed reaction tube which is divided into two parts. The first part ⅓ to ½ (which may be called the preheating section) is designed to give the best heat transfer. The remaining part is a smooth tube sloping at about 30° to allow separation of gaseous reaction products without surging. The reaction mixture is discharged from the reaction tube into a still pot which is maintained at a temperature preferably between 80–95° C. As the mixture enters the pot the diethyl peroxide is flashed off, together with other volatile constituents, and passes into a rectifying column with a head temperature of 56 to 90° C. The product flows from the top of this column into a condenser wherein it is condensed. From there it flows into a recovery vessel wherein it is immediately dissolved in water with agitation.

The reaction has been described as being carried out by way of a continuous process and when so conducted it has been found advantageous to maintain the input of reactants to the reaction zone at a ratio of from 10 to 15 parts of hydrogen peroxide, 20 to 30 parts of diethyl sulfate and 50 to 60 parts of potassium hydroxide solution, the parts being on a volume ratio basis. This ratio may be varied over a wide range without adversely affecting the product or operation of the process.

The amount of emulsifying agent used will, of course, be determined by its efficiency although generally from 0.01 to 2.0% by weight of the emulsifying agent based on the weight of dialkyl sulfate and aqueous caustic is sufficient to give suitably stable emulsions for effecting the reaction.

Alkalies other than potassium hydroxide may be used as, for example, other hydroxides of the alkali metals, and alkaline earth metals. It is not necessary that an alkali metal or alkaline earth metal hydroxide be used for other alkaline salts such as the carbonates are suitable. The concentration of alkali in water need not necessarily be that disclosed in the example, but may be present in amounts ranging between 2 and 90% (of the total reaction mixture). It is important, however, that the aqueous alkali be of such concentration as to react with a dialkyl sulfate used in the process.

The dialkyl sulfate to be used in the reaction is that corresponding to the dialkyl peroxide or alkyl hydrogen peroxide desired. Accordingly, dimethyl, diethyl, dipropyl, diisopropyl, dibutyl and the higher dialkyl peroxides and alkyl hydrogen peroxides may be prepared from the corresponding dialkyl sulfates.

While the preferred embodiment of the invention as described in the example is directed to a continuous process, the process may likewise be carried out as a batch or discontinuous process although experience has shown that more uniform results and less danger in handling the product result from the continuous method of operation.

A batch process may be conducted in accord with this embodiment.

*Example 2.*—A solution of 25 parts by weight, 0.45 mol, of potassium hydroxide in 50 parts of water is prepared, cooled, and added to the reaction flask. Thirty parts, 0.22 mols, of diethyl sulfate are added to the reaction flask and the flask is swept out with oxygen-free nitrogen. The flask is then heated by means of a water bath, which in turn is heated by means of a copper coil through which either steam or water may be conducted, to 60° C. Twenty parts (0.176 mol) of cold 30% hydrogen peroxide is then added slowly over approximately 5–10 minutes to the reaction mixture while it is held at 60–70° C. and stirred vigorously to emulsify the mixture of substances. The reaction proceeds vigorously with ebullition of diethyl peroxide which distills out of the reaction flask into the receiver. When the reaction has subsided the water bath is cooled to 60° and another run is made immediately and collected in the same receiver. A series of runs can thus be made and combined. The material which collects in the receiver consists of two layers. The upper layer which is nearly pure diethyl peroxide is separated. The lower layer is a mixture containing ethyl hydrogen peroxide. The combined upper layers from 19 runs gave a yield of 41.5% based on the hydrogen peroxide.

The temperature of the reaction will vary and will be determined by the rate of reaction of the particular reactants involved. Since, however, both the hydrogen peroxide and the mixture of aqueous alkali and dialkyl sulfate are themselves decomposed by heat, it will not be possible to operate at temperatures in excess of that at which these side reactions predominate. At the same time, it is necessary that the reaction proceed rapidly. Furthermore, for optimum yields it is advisable to bring the reactants up to temperature but not above 100° C., as rapidly as possible. It has been found in the operation of this invention that the proper temperature is approximately the temperature at which the dialkyl sulfate reacts with the alkali to form a dialkyl ether. If the hydrogen peroxide is added to the reaction mixture and is present when the temperature reaches the temperature at which the dialkyl ether would be formed in its absence, the dialkyl peroxide will be formed. The choice of various alkaline reagents or dialkyl sulfates which may be used in the exercise of this invention will require the judicious selection within the broad temperature range of the proper temperature since not all of the combinations of alkali and dialkyl sulfate will react with facility at the same temperature.

Variations in the procedure which may result from the operation of the invention with dialkyl sulfates of shorter or longer carbon chains may be made without departing from the spirit of the invention. Thus, it may not be feasible to distill the product from the reaction mixture because of its high boiling point. In this case procedures such as the following may be adopted in order to obtain the desired dialkyl peroxide. After the reaction has proceeded to completion, the dialkyl peroxide may be steam distilled from the reaction mixture, or since the dialkyl peroxides as a class are insoluble in water, the product may be separated from the aqueous layer after the reaction has finished and may then be subjected to fractionation. This fractionation may be carried out at reduced pressures. The dialkyl peroxide, if of sufficiently high molecular weight to be a solid, may be separated from the reaction by solidification through cooling followed by filtration, drying, and recrystallization.

The alkyl hydrogen peroxides and dialkyl peroxides prepared in accord with this invention are of a type that could likewise be called dioxides because of their theoretical linear structure. Ethyl hydrogen peroxide, for example, is believed to have the formula $C_2H_5OOH$ and the diethyl peroxide is believed to have the formula $C_2H_5OOC_2H_5$. The structure is given in order to avoid confusion with peroxides of the literature although the invention is not restricted to these theoretical considerations.

I claim:

1. A process for the preparation of diethyl peroxide which comprises preparing an emulsion of 20% aqueous potassium hydroxide and diethyl sulfate, the aqueous potassium hydroxide and the diethyl sulfate being present in a ratio of from 20 to 30 parts of diethyl sulfate to from 50 to 60 parts of aqueous potassium hydroxide based on a volume ratio, mixing the resulting emulsion with 10 to 15 parts of 30% hydrogen peroxide on the same basis and thereafter subjecting the resulting mixture to a temperature between 56 and 100° C. and subsequently, as rapidly as formed, distilling the diethyl peroxide from the reaction mixture by flash distillation.

2. A process for the preparation of a dialkyl peroxide selected from the group consisting of dimethyl, diethyl, and dipropyl peroxide, which comprises preparing an aqueous emulsion of hydrogen peroxide and a dialkyl sulfate selected from the group consisting of dimethyl, diethyl, and dipropyl sulfate in an alkaline medium, subjecting the emulsion to a temperature between 25 and 100° C. and distilling off the dialkyl peroxide substantially as rapidly as formed.

3. A process for the preparation of dimethyl peroxide which comprises subjecting an aqueous emulsion of hydrogen peroxide and dimethyl sulfate in an alkaline medium to a reaction at a temperature between 50 and 85° C. and simultaneously distilling off the dimethyl peroxide substantially as rapidly as formed.

4. A process for the preparation of diethyl peroxide which comprises subjecting an aqueous emulsion of hydrogen peroxide and diethyl sulfate in an alkaline medium to a reaction at a temperature between 50 and 85° C. and simultaneously distilling off the diethyl peroxide substantially as rapidly as formed.

5. A process for the preparation of dipropyl peroxide which comprises subjecting an aqueous emulsion of hydrogen peroxide and dipropyl sulfate in an alkaline medium to a reaction at a temperature between 50 and 85° C. and simultaneously distilling off the dipropyl peroxide substantially as rapidly as formed.

6. A process for the preparation of diethyl peroxide which comprises subjecting an aqueous emulsion of hydrogen peroxide, an aqueous solution of sodium hydroxide, and diethyl sulfate to a reaction at a temperature between 25 and 100° C. and simultaneously distilling off the diethyl peroxide substantially as rapidly as formed.

RICHARD HAVEN WILEY.